United States Patent Office 2,830,093
Patented Apr. 8, 1958

1

2,830,093

2-ISOPROPYL 8,13-DIMETHYL Δ(1,2) AND Δ(2,3) POLYHYDROPHENANTHRYL TERTIARY CARBINOLS AND PREPARATION AND RECOVERY THEREOF

Nicholas Thomas Farinacci, New York, N. Y.

No Drawing. Application September 18, 1956
Serial No. 610,623

19 Claims. (Cl. 260—617.5)

This invention relates to new compositions, the dihydrolevopimaryl tertiary carbinols of the structure

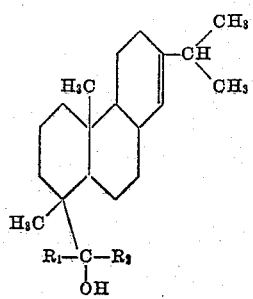

and

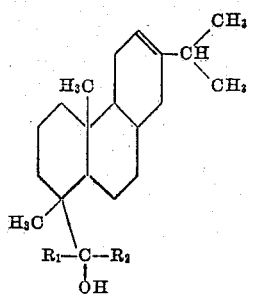

wherein $R_1$ and $R_2$ are each selected from the group consisting of the alkyl and aryl radicals, and to a new process for the preparation, thereof, which is generally adaptable for the preparation of tertiary carbinols of the 8,13-dimethyl polyhydrophenanthrene group of the abietyl and di-pimaryl types of the phenanthrene series of compounds.

The invention relates particularly to the novel Δ(1,2) and Δ(2,3) 2-isopropyl-8,13-dimethyl polyhydrophenanthrene-8-tertiary diphenyl carbinols and to the related corresponding 8-tertiary diphenyl methyl derivatives of the group of abietyl and d-pimaryl types of compounds and the preparation, thereof, as by heat rearrangement-dehydration of the corresponding tertiary diphenyl carbinols.

The novel products of this invention are particularly useful intermediates for the production of corresponding halogenated compounds which are utilized for the manufacture of compounds such as the 2-oxygenated side chain halogenated carbinols, all of which are utilized for the preparation of such as the Δ(8,14)(1,2) 7-keto-2 aceto-13 methyl polyhydrophenanthrenes which latter are especially useful for treatment of disorders related with deficiencies of the seminal organs, testicular and pituitary glands. The said unsaturated 7-keto polyhydrophenanthrenes, the preparation of which is described in copending application Serial No. 441,646, filed July 6, 1954, are useful also for the preparation of natural cyclopentanopolyhydrophenanthrene hormones as noted herein, and accordingly, the novel compounds of this invention are further useful for this purpose.

The invention further relates to a novel recovery process for the tertiary carbinols produced thereby.

It now is found that the dihydrolevopimaryl tertiary diphenyl carbinols readily tend to dehydrate with rearrangement so that they cannot be prepared by the usual methods. Thus the products obtained in a high temperature preparation, or moderately high temperature distillation, e. g., by subjecting carbinols to above about 110° C., are rearranged hydrocarbons, the carbinols being converted thereby, for example, to derivatives having a ring A structure in the formula

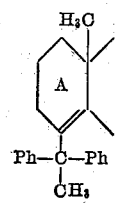

in a tricyclic radical

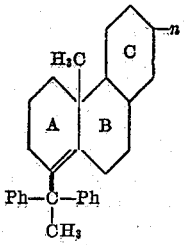

wherein Ph is phenyl, n is selected from the group consisting of $-CH(CH_3)_2$, $=C(CH_2)$,

and

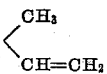

and B- and C- ring unsaturation corresponds to the carbinol from which it is produced, such as in the corresponding Δ(8,14)(1,2) and Δ(8,14)(2,4) polyhydrophenanthrene tertiary diphenyl methyl derivatives, which also may be prepared by subjecting the dihydrolevopimaryl tertiary diphenyl carbinols to dehydrating action of acidic anhydrides and the like as disclosed in copending application Serial No. 610,625, filed September 18, 1956, as a continuation-in-part of application Serial No. 441,646, filed July 6, 1954, as a continuation-in-part and based on application Ser. No. 198,892, filed December 2, 1950, now abandoned. These methods of rearrangement-dehydration are found to be adaptable generally to the tertiary diphenyl carbinols of the group of abietyl and dextropimaryl types of the phenanthrene series of compounds. For the purpose of this invention this group includes the abietyl, neoabietyl, levopimaryl, dehydroabietyl, 6-OH dehydroabietyl, dextropimaryl, 7-ethyl(14–8 epoxy)dextropimaryl, and the Δ(6,7) and Δ(7,8) dihydrolevopimaryl tertiary carbinols of this invention and certain derivatives of these such as are disclosed in the copending applications whose subject matter is summarized below.

It is previously not known to effect production of tertiary carbinols by Grignard reaction from members of the group of monounsaturated acids derived from the abietyl group of acids which, as shown as in Cox, Jour. American Chem. Soc., 66, pp. 865–9 (1944), apparently are precluded from forming tertiary carbinols because of their tendency to form lactone of hydroxy tetrahydroabietic acid when the therein disclosed monounsaturated acids are treated in accordance with usual esterification with alcohols and acid catalyst and the product ester reacted with such as methyl magnesium halides yield a mixture of such as the Δ(4,12) and Δ(11,12) 8,13-dimethyl polyhydrophenanthrene-8-carboxy acids the so called dihydroabietic acids. Fleck and Palkin, Jour. Am. Chem. Soc., 61, p. 3198 (1939) found that the strong tendency of even the methyl esters of the hydrated dihydroabietic acids to form lactone preclude the determination of double bond position in oxidation experiments.

The structural characteristics of the polyunsaturated and saturated members of the abietic series such as abietic, levopimaric, dehydroabietic and tetrahydroabietic which do not show such lactone-forming behavior appear to be such as to permit of normal behavior with respect to Grignard reaction of esters to form tertiary carbinols, cf., Zeiss, U. S. 2,540,157 (1951).

I have now discovered a process for preparing high yields of dihydrolevopimaryl (having a monounsaturation in the C-ring of the tricyclic nucleus) tertiary carbinols and a process of recovery thereof, substantially pure which comprises the reaction of the corresponding monounsaturated dihydrolevopimaryl esters with such as the alkyl and aryl halide magnesium salts in inert relatively high boiling solvents while operating at temperatures less than about 110° C. in the range above 50° C. and the hydrolysis of the so-formed Grignard complex with acidic reagents and the separation of substantially pure tertiary carbinol from the reaction mixture by a means wherein the mixture of organic residues containing unreacted acid esters as the major impurities mixed with the desired tertiary carbinol is subjected to action of methanolic alkali. This serves to degrade the unreacted acid esters and remove the alkali salts of acid constituents and minor amounts of side products such as polyphenylmethanes by the selective solubility in the methanol solvent from the insoluble tertiary carbinol. Thus there is obtained uniquely in the application of these new methods to suitable acid esters, substantially pure tertiary carbinol in high yield as the insoluble residue of the above operations. The amount of alkali used for degradation of unreacted esters should be at least an equivalent relative to the amount of unreacted ester, preferably, from 4–40 equivalents of alkali salt may be used.

The new process may be used generally to provide high conversions and high yields for the production of 8,13-dimethyl polyhydrophenanthrene tertiary carbinols of the group of abietyl and dextropimaryl types.

Although a preferred scheme for the Grignard complex formation comprises the reaction of such as a Δ(7,8) methyl dihydro-levo-pimarate which has the formula

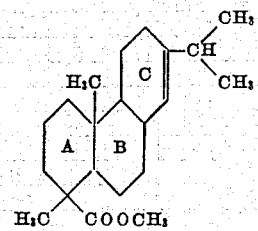

(which may be prepared by the catalytic hydrogenation of the levo-pimaryl ester with palladium and hydrogen) with a slight excess of such as a phenyl magnesium halide in benzene or toluene, it will be immediately apparent to one skilled in the art that other dihydro-levo-pimaryl esters, proportions and concentrations of the reactants as well as the temperature provided it is below about 110° C., in the range above about 50° C., may be varied within wide limits and that a wide choice of alkane or aromatic solvent medium may be made from a group of suitable inert solvents. For example, a preferred economical process is the treatment of said methyl ester with a 5% excess of phenyl magnesium bromide in benzene at 80° C. for 6 to 8 hours. At the higher temperatures Grignard reaction is complete within a few hours while at about 50° C., the reaction my take several days to provide a substantial conversion. Suitably, alkyl or aryl halide magnesium salts, such as the phenyl magnesium chloride, iodides, and the halides generally may be used for the Grignard reaction and such inert solvents which boil above about 50° C. including the propyl and higher alkane ethers, or liquid alkane and aromatic hydrocarbons such as heptanes, octanes, benzenes, toluenes and xylenes. The preferred scheme for preparing the substantially pure tertiary carbinol comprises the reaction of the unreacted esters with hot methanolic alkali in the crude magnesium free organic mixture obtained by acidic hydrolysis of the Grignard complex. The subsequent removal of alkali salts of acidic constituents from the ester hydrolysate and minor amounts of side products diphenylmethane, phenol and phenyl halides in the alcohol layer results in leaving a solid phase of substantially pure tertiary carbinol. Alternatively, the corresponding abietyl or neoabietyl esters may be used as starting materials for this production of tertiary carbinols, including the heat or acid isomerization thereof, to levopimaryl esters and catalytic hydrogenation thereof, as the first operations and illustrating the production of dihydrolevopimaryl tertiary carbinols from each of these starting materials.

I have found it desirable to avoid temperatures above 110° C., in these operations to prevent rearrangement-dehydration of such as the tertiary diphenyl carbinol to aforementioned corresponding tertiary diphenyl methyl derivatives. For the same reason it is impracticable to prepare a tertiary carbinol by high temperature Grignard reaction, hydrolysis and vacuum distillation.

The dihydro-levo-pimaryl tertiary diphenyl carbinols of this invention are new and newly useful intermediates for the preparation of new and useful compositions, for example, halogenated tertiary carbinols, useful intermediates for manufactures in the field of therapeutics as shown in the copending applications Serial Nos. 416,434, 428,852, 441,646 and applications based, thereon, e. g., Serial Nos. 610,624 and 610,625, filed September 18, 1956.

The tertiary carbinols and corresponding tertiary diphenylmethyl compounds are prepared from such as suitably constituted dihydro-levo-pimaryl esters as specifically disclosed in the following examples (quantities of reactants are given in parts by weight). The examples are illustrative in nature and are not to be construed as limiting my invention.

EXAMPLE 1

318 grams of Δ(7,8) methyl dihydro-levo-pimarate ($b_{0.2}$ 164–174° ($n_D$ 1.5130), $a_{20}{}^D=42°$ in alcohol, saponification number 189, C=79.3%, H=10.38%) is treated with 374 grams of phenyl magnesium bromide in 2 liters of benzene and heated at reflux temperature for 6 hours. The solution is directly treated with 220 grams of sulfuric acid (95%) in 2 liters of water with cooling and the benzene layer is removed, washed twice with 1 liter of water and freed of volatile solvent by heating on steam bath and evacuation. The organic residue is treated with 2 liters of methanol containing 10% NaOH and refluxed for three hours. The methanolic layer is removed by decantation and the residue is washed with 1 liter of methanol then with 1 liter of water. The residue 420 grams comprises substantially pure Δ(7,8) dihydro-levo-pimaryl tertiary diphenyl carbinol $C_{32}H_{42}O$, molecular weight 442 in 95% yield has the following constants $n_D$=1.5710, C=86.4%, H=9.80%, distills at 2 mm.

pressure with decomposition at 180° C., $\alpha_D=7.5°$ and the formula

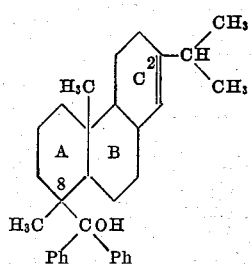

wherein Ph represents phenyl. The 7,8-dibromo derivative has a formula $C_{32}H_{42}OBr_2$, percent Br=26.5 and the 7-chloro-8-hydro derivative has a formula $C_{32}H_{43}OCl$, 7.4% Cl.

As set forth above, this carbinol is heated to above about 110° C., in the range to 150° C., it is rearranged and dehydrated, resulting in the corresponding $\Delta(8,14)$-(1,2) - 13 - methyl-2-isopropyl polyhydrophenanthrene-8-tertiary diphenyl methyl compound, $C_{32}H_{40}$, molecular weight 424. The 1,2-dibromo derivative has a formula $C_{32}H_{40}Br_2$, molecular weight 584, C=65.1%.

EXAMPLE 2

3.8 grams of $\Delta(7,8)$ phenyl dihydro-levo-pimarate is treated with 4 grams of phenyl magnesium chloride in 200 cc. of toluene and heated to 90° C. for 5 hours. The solution is treated with 3 grams of 95% sulfuric in 200 cc. water with cooling and the magnesium free organic residue is obtained as in Example 1. It is treated with 100 cc. of 10% methanolic NaOH, refluxed for 2 hours and 4 grams of substantially pure $\Delta(7,8)$ dihydro-levo-pimaryl tertiary diphenyl carbinol is recovered as insoluble residue by the procedure in Example 1.

As set forth above, if this carbinol is heated to above about 110° C., in the range to about 150° C., it is rearranged and dehydrated resulting in the corresponding $\Delta(8,14)(1,2)$ - 13 - methyl-2-isopropyl polyhydrophenanthrene-8-tertiary diphenyl methyl compound, having the formula

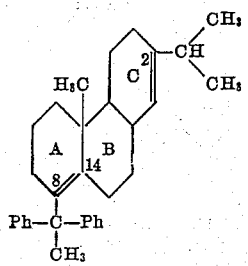

wherein Ph represents phenyl.

EXAMPLE 3

3.8 grams of $\Delta(7.8)$ ethyl dihydro-levo-pimarate is treated with 5 grams of methyl magnesium iodide in 200 cc. of butyl ether to 95° C. for 4 hours. The solution is treated with 10 grams of $NH_4Cl$ in 200 cc. of water with cooling and the magnesium free organic residue is obtained as in Example 1, and treated with 100 cc. of 10% methanolic KOH, refluxed for 2 hours and 3.7 grams of substantially pure $\Delta(7.8)$ tertiary dimethyl carbinol is recovered as insoluble residue as by the procedure in Example 1.

EXAMPLE 4

4.0 grams of methyl dextropimarate is treated with 5 grams of methyl magnesium bromide as in Example 1, and the hydrolysis mixture (organic residue) freed of inorganic magnesium salts is treated with methanolic NaOH as in Example 1, to produce 3.8 grams of the corresponding dextropimaryl tertiary dimethyl carbinol.

EXAMPLE 5

The d-pimaryl and dehydroabietyl tertiary diphenyl carbinols prepared by the method of Example 1, on heating to about 150° C. provide the corresponding tertiary diphenyl methyl compounds which are recovered by chromatographic absorption on a column of activated $Al_2O_3$ by elution with hexane.

The general method of preparation of esters or tertiary carbinols such as the dihydrolevopimaryl type is disclosed in copending applications Serial Nos. 428,852 and 610,624, for example, the $\Delta(6,7)$ dihydrolevopimaryl compounds as preparable from the $\Delta(7,8)$ dihydrolevopimaryl esters or tertiary carbinols by converting them to such as the corresponding 7-monochlor esters or carbinols from which by dehydrohalogenation as disclosed in copending applications Serial Nos. 428,852 and 610,625, there is provided such as the corresponding $\Delta(2,3)$ 8,13-dimethyl-2-isopropyl (or 2-aceto) polyhydrophenanthrenes having an 8-carboxy or carboxy-ester group or an 8-tertiary carbinol group from which the corresponding 2,3-dihalides may be prepared according to the halogenation process disclosed in copending applications Serial Nos. 610,624, 428,852 and 610,625 and the tertiary carbinols may be prepared from the esters as disclosed herein.

In general esters or tertiary carbinols having

—CHOHCH$_3$ or —CHOHCH$_2$OH as a 2-substituent are prepared as described in copending applications Serial Nos. 610,624 and 610,625 by reacting the corresponding ester or tertiary carbinol having a —CH=CH$_2$ as a 2-substituent with dilute $H_2SO_4$ or with dilute $KMnO_4$ in aqueous acetone solutions.

The prior and current art which deals with tertiary rosin carbinols are given in the references:

(5) Vocke: Liebigs Ann., 497, 247 (1932).
(6) Ruzicka et al.: Helv. Chim. Acta, 23, 124 (1940).
(7) Zeiss: (a) J. Am. Chem. Soc., 69, 303 (1947); (b) ibid., 73, 497 (1951); (c) Chem. Rev., vol. 42, p. 171 (1948).
(8) Brossi et al.: Helv. Chim. Acta, 33, 1730 (1950).
(9) Kharasch et al.: J. Org. Chem., 16, 447 (1951).
(10) Campbell: U. S. 2,359,825, Oct. 10, 1944.

The Table I includes the average yields of rosin acid tertiary carbinols found by those skilled in the art utilizing the Zeiss method of adapting the Grignard reaction.

Table I

| Reference | Product | Reported Yield, percent |
|---|---|---|
| Vocke (ref. 5) | t-diphenyltetrahydroabietinol. | 40. |
| Ruzicka et al. (ref. 6) | t-dimethyl 7-ethyl-8-methyl-14-hydroxy d-pimarinol. | less than 40. |
| Zeiss (ref. 7b) | t-diphenyl dehydroabietinol. | 36. |
| Zeiss (ref. 7a) | t-diphenyl 6-OH dehydroabietinol. | 24.5. |
| Brossi et al. (ref. 8) | t-diphenyl dehydroabietinol. | less than 30. |
| Kharasch et al. (ref. 9) | t-diphenyl dehydroabietinol. | 36. |

The superior performance in respect to average yields is evident in the comparison of applicant's method applied to the dihydro-levo-pimarate esters, listed in Table II.

Table II

Applicant's method applied to $\Delta(7,8)$ dihydro-levopimarate esters and to d-pimaryl esters.

| Run No. | Product | Reported Yield, percent |
|---|---|---|
| 1 | t-diphenyl-dihydro-levo-pimarinol | 93 |
| 2 | do | 98 |
| 3 | do | 93 |
| 4 | do | 91 |
| 5 | t-dimethyl dihydro-levo-pimarinol | 92 |
| 6 | t-dimethyl dextropimarinol | 90 |

In this specification and claims the numbering system of the pimaryl residue which is used, coresponds to that of Fieser and Campbell in the Journal of the American Chem. Society, vol. 60, No. 1, p. 159 (1938), and in Fieser and Fieser, Natural Products Related to Phenanthrene, chap. 2, 3rd ed., 1949, Reinhold Publishing Co., New York, N. Y.

The group of inventions comprised in the copending applications as noted below relates to converting the readily available pine resin acids to materials having androgenic activity, which materials may be further converted to natural cyclopentanopolyhydrophenanthrene type of hormones. They are described and claimed in copending applications Serial No. 416,433 (610,623), Serial No. 416,434 (610,624), Serial No. 428,852, Serial No. 441,646 (610,625) and Serial No. 390,747 (647,986). (Applications Serial Numbers 416,433, 416,434, 441,646, and 390,747 are now abandoned.)

In this overall process an ester derivative of a pine resin acid is converted to a tertiary carbinol by Grignard reaction.

In this connection there are included an improved method for obtaining high yields of carbinol of the order of 95% of theory by operation at elevated temperatures with high boiling solvents, and also a novel method of recovery of the high yield of desired novel carbinol products in substantially pure form by degradation and removal of the unreacted acid esters therefrom, and also a method for rearranging and dehydrating the tertiary carbinol product to corresponding tertiary diphenyl methyl compounds. These novel features and intermediate compounds are described and claimed in the present application as a continuation-in-part of application Serial No. 416,433 filed March 15, 1954, as a continuation-in-part of application Serial No. 198,893, filed December 2, 1950, now abandoned.

The class of nuclearly monounsaturated tertiary carbinols obtained thereby are converted to corresponding saturated halides by halogenation or hydrohalogenation which features and carbinol halide products are described and claimed in copending application Serial No. 610,624, filed September 18, 1956, as a continuation-in-part of application Serial No. 416,434, filed March 15, 1954, as a continuation-in-part of application Serial No. 198,894, filed December 2, 1950, now abandoned.

The resulting carbinol halides and the corresponding C-ring aromatized tertiary carbinols (obtained as above from the corresponding aromatized pine resin acids) are subjected to selective oxidation which converts the 2-side chain of the polyhydrophenanthrene tertiary carbinol to an alpha carbonyl group, which features and carbinol products are described and claimed in application Serial No. 428,852, filed May 10, 1954, as a continuation-in-part of application Serial No. 198,895, filed December 2, 1950, now abandoned.

The carbinol in the material obtained by any of the above discussed methods is rearranged and dehydrated to provide a tertiary diphenyl methyl compound, an (8, 14) unsaturated double bond is formed by removal of elements of water from the rearranged carbinol and the resulting compounds are oxidized on the active methylene group thereby formed which is adjacent to the said tertiary diphenyl methyl group, to provide the corresponding alpha-beta unsaturated 7-keto polyhydrophenanthrene compounds, which are shown to have androgenic and anabolic activities, which features and compounds are described and claimed in the application Serial No. 610,625, filed September 18, 1956, as a continuation-in-part of application Serial No. 441,646, filed July 6, 1954, which is a continuation-in-part of application Serial No. 198,892, filed December 2, 1950, now abandoned.

In the oxidation step, there are obtained as side products corresponding polyhydronapthone propionic acids and lactones, and these may be converted to the corresponding above mentioned 7-keto polyhydrophenanthrene compounds by treatment with an acetlyating agent as by treatment with phenyl acetate-sodium hydride reagent (or with methyl halide magnesium salts) which features and intermediate polyhydronaphthalene compounds are described and claimed in copending application Serial No. 647,986, filed March 25, 1957, as a continuation-in-part of Serial No. 390,747, filed November 6, 1953, as a continuation-in-part of application Serial No. 260,231, filed June 6, 1951, now abandoned.

The above mentioned 7-keto polyhydrophenanthrenes may be converted to suitable corresponding acetic or propionic acid ester derivatives which may be cyclyzed to corresponding known cyclopentanopolyhydrophenanthrene hormone intermediates, which may be converted by well known methods to natural steroid hormones.

In these fields, two types of nomenclature and numbering are established, (1) in terms of the structural isomers of the abietyl and d-pimaryl types wherein the tricyclic numbering is shown in the formulas given as carbon skeletons.

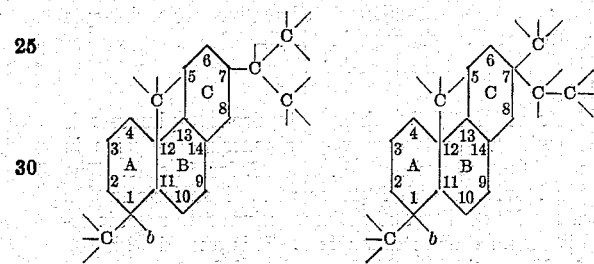

wherein $b$ is a tertiarily bound group such as —COOR, —COHPh$_2$ and —CH$_2$OH, —CH$_2$NH$_2$, wherein R and Ph have the definitions defined herein and (2) in terms of a polyhydrophenanthrene nomenclature and numbering, wherein the tricyclic numbering is as shown in the same carbon skeletons, as shown in the formula below, both of which are

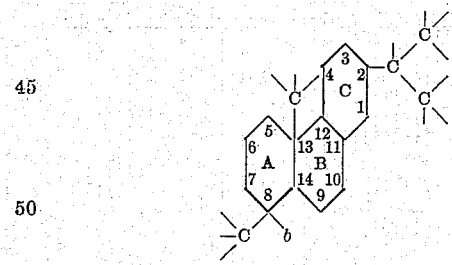

used herein, to conform with both as used in Fieser and Fieser, Natural Products Related to Phenanthrene, chap. 2, 3rd ed., Reinhold Publ. Co., N. Y., see pp. 41, 64 and 85, thereof, particularly.

This application is a continuation-in-part of my copending application Serial No. 416,433, filed March 15, 1954, based on application Serial No. 198,893, filed December 2, 1950, and now both abandoned in favor, hereof.

The preparations of starting materials for this invention are described in applications Serial Nos. 198,892, 198,893, 198,894 and 198,895, filed simultaneously December 2, 1950, and incorporated in refiled applications based thereon Serial Nos. 416,433, 416,434, filed March 15, 1954, and 428,852, 441,646, filed May 10, 1954, and July 6, 1954, respectively, and applications Serial Nos. 610,623, 610,624 and 610,625, filed September 18, 1956, and application Serial No. 647,986, which descriptions and relevant disclosures are hereby incorporated, herein.

The material prepared in accordance with this case is used in the preparation of other starting materials as set forth in applications Serial Nos. 198,892, 198,893, 198,894, 198,895, 416,433, 416,434, 428,852, and 441,646, and application Serial No. 647,986 which descriptions and relevant disclosures as set forth in said cases are hereby incorporated, herein.

What I claim is:

1. A process for the preparation of an 8,13-dimethyl polyhydrophenanthrene-8-tertiary carbinol having as a 2-substituent a member of the group consisting of —CH(CH$_3$)$_2$, —CH=CH$_2$, —CHOHCH$_3$, —CH$_2$CH$_3$ and —CHOHCH$_2$OH radicals, wherein the 13-angular methyl and 8-tertiary carbinol groups are in trans relationship, the phenanthrene nucleus having at most four double bonds located in the B and C rings of the structural skeleton

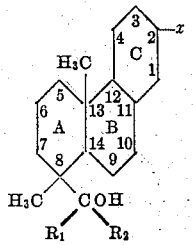

wherein $x$ represents said 2-substituent and $R_1$ and $R_2$ each being a member of the group consisting of alkyl and aryl radicals, from a corresponding 8,13-dimethyl polyhydrophenanthrene 8-carboxylic-ester reactant compound, said reactant compound having said 2-substituent and having as an 8-substituent a member of the group consisting of a carboalkoxy and a carboaryloxy radical, wherein the 13-angular methyl group and said 8-substituent are in trans relationship and having at most four double bonds located in said B and C rings, which process comprises subjecting a mixture of said reactant compound, a hydrocarbon halide magnesium salt, said salt being a member of the group consisting of alkyl and aryl magnesium halide salts, and an inert solvent boiling above 50° C., to a temperature in the range above about 50° up to below about 110° C., and subjecting the organo-magnesium complex resulting therefrom, to the action of an acidic agent, whereby said complex is hydrolyzed and there is obtained a high yield of desired tertiary carbinol and recovering said carbinol.

2. A process of claim 1, wherein the temperature is maintained in the range above about 80° and below about 95° C.

3. A process of claim 1, wherein the hydrocarbon halide magnesium salt is an aryl halide magnesium salt.

4. A process of claim 1, wherein a polyhydrophenanthrene 8-carboxylic-ester having an isopropyl group as a 2-substituent and one nuclear double bond in a position adjacent to said isopropyl group is a reactant compound.

5. A process of claim 4, wherein a polyhydrophenanthrene-8-carboxylic-ester having a carbomethoxy radical as an 8-substituent is a reactant compound.

6. In a process of recovery of an 8,13-dimethyl polyhydrophenanthrene-8-tertiary carbinol from a mixture thereof with an 8,13-dimethyl polyhydrophenanthrene-8-carboxy ester having as said 8-carboxylic-ester substituent a member of the group consisting of a carboalkoxy and a carboaryloxy radical, said carbinol and carboxy-ester each having as a 2-substituent a member of the group consisting of —CH(CH$_3$)$_2$, —CH=CH$_2$, —CHOHCH$_3$, —CHOHCH$_2$OH and —CH$_2$CH$_3$ radicals, the method which comprises heating said mixture with a methanolic alkali solution containing in the range above about 1 to below about 40 equivalents of alkali hydroxide relative to said ester, whereby said ester is converted to the corresponding alkali carboxylate salt, which salt is soluble in methanol, and separating the desired tertiary carbinol as the solid phase of the resulting mixture.

7. A process of claim 6, wherein the mixture of carboxylic-ester and corresponding tertiary carbinol results from subjecting a mixture of a said carboxylic-ester reactant, a hydrocarbon halide magnesium salt, said salt being a member of the group consisting of alkyl and aryl halide magnesium salts and an inert solvent boiling above 50° C. to a temperature in the range above 50° up to below about 110° C. and subjecting the organo-magnesium complex resulting therefrom to the action of an acidic agent, whereby said complex is hydrolyzed and recovering said mixture of carboxylic-ester and corresponding tertiary carbinol.

8. A process of claim 7, wherein a carboxylic-ester of the mixture is a methyl ester.

9. A process of claim 7, wherein a carboxylic-ester of the mixture is a phenyl ester.

10. A process for the production of a 13-methyl polyhydrophenanthrene-8-tertiary diphenyl methyl compound having one nuclear double bond located in the A ring in the 8:14 position, and having as a 2-substitutent a member of the group consisting of —CH(CH$_3$)$_2$, —CH=CH$_2$, —CHOHCH$_3$, —CHOHCH$_2$OH and —CH$_2$—CH$_3$ radicals, wherein the phenanthrene nucleus has at most four double bonds located in the B and C rings of the structural skeleton

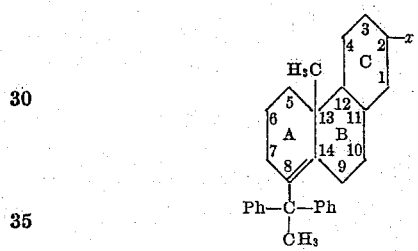

wherein $x$ represents said 2-substituent group and Ph represents phenyl, from a corresponding 8,13-dimethyl polyhydrophenanthrene-8-tertiary diphenyl carbinol reactant compound having said 2-substituent and wherein the 13-angular methyl and 8-tertiary diphenyl carbinol groups are in trans relationship, the phenanthrene nucleus of which reactant carbinol compound having said at most four double bonds located in the said B and C rings, which process comprises heating said carbinol reactant compound to a temperature in the range above about 110° up to below about 180° C., whereby the desired-8-tertiary diphenyl methyl polyhydrophenanthrene compound is produced.

11. A new 8,13-dimethyl-2-isopropyl polyhydrophenanthrene-8-tertiary carbinol having as said 8-carbinol substituent, —COHR$_1$R$_2$, wherein R$_1$ and R$_2$ are each a member of the group consisting of an alkyl and an aryl radical, wherein the 13-angular methyl and 8-tertiary carbinol groups are in trans relationship and having one nuclear double bond, said double bond being in a position adjacent to said isopropyl group.

12. A compound of claim 11, wherein the nuclear double bond is in the 1:2 position.

13. A compound having the formula

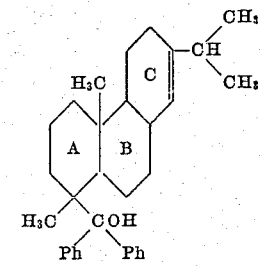

wherein Ph represents phenyl.

14. A compound having the formula

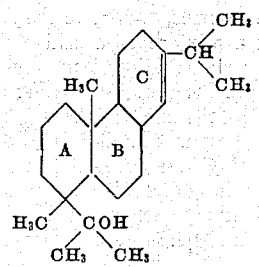

15. A new 13-methyl polyhydrophenanthrene-8-tertiary diphenyl methyl compound having a double bond located in the A ring in the 8:14 position, and having as a 2-substituent a member of the group consisting of —CH(CH$_3$)$_2$, —CH=CH$_2$, —CHOHCH$_3$
—CHOHCH$_2$OH and —CH$_2$CH$_3$ radicals, wherein the phenanthrene nucleus having at most four double bonds located in the B and C rings of the structural skeleton

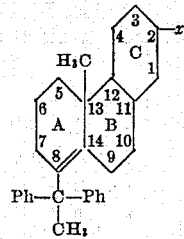

wherein $x$ represents the said 2-substituent and Ph represents phenyl.

16. A compound of claim 15, having at most two double bonds in the nucleus.

17. A new compound having the formula

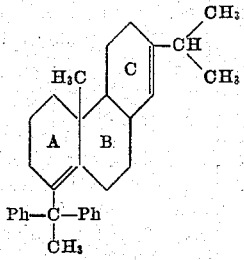

wherein Ph represents phenyl.

18. A new compound having the formula

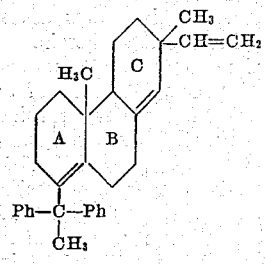

wherein Ph represents phenyl.

19. A new compound having the formula

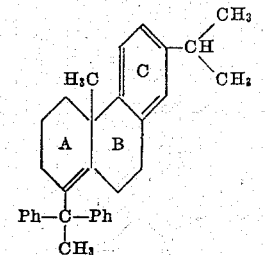

wherein Ph represents phenyl.

References Cited in the file of this patent
UNITED STATES PATENTS
2,540,157    Zeiss _____ Feb. 7, 1951